United States Patent [19]

Feinberg

[11] 4,363,441

[45] Dec. 14, 1982

[54] THERMAL ENERGY USAGE METER FOR MULTIPLE UNIT BUILDING

[76] Inventor: Emanuel Feinberg, 24316 Martha Washington, Southfield, Mich. 48076

[21] Appl. No.: 142,937

[22] Filed: Apr. 23, 1980

[51] Int. Cl.³ .................... G01K 17/00; G05D 23/00
[52] U.S. Cl. ........................................ 236/36; 236/94; 165/11 R; 73/193 A
[58] Field of Search ............... 236/94, 36; 165/11; 73/193 A, 193 R

[56] References Cited

U.S. PATENT DOCUMENTS

| | | | |
|---|---|---|---|
| 3,580,070 | 5/1971 | Cumpston, Jr. | 73/193 R |
| 4,221,260 | 9/1980 | Otala et al. | 165/11 R |
| 4,245,501 | 1/1981 | Feller | 165/11 R |
| 4,250,747 | 2/1981 | Diprose et al. | 73/193 R |

Primary Examiner—William E. Wayner
Attorney, Agent, or Firm—Krass, Young & Schivley

[57] ABSTRACT

A system for measuring thermal usage of each occupied area in a multiple tenant building equipped with a central hydronic heating and/or cooling system includes a fluid circuit for each area, each circuit being connected in parallel to a central fluid main circuit. Thermostats disposed in each of the areas control flow shut-off valves for each circuit. The shut-off valves are disposed in integrated assemblies with automatic flow regulator devices that maintain constant flow through each circuit when the shut-off valve is open, and fluid temperature sensors. Separate sensors provide the outlet fluid temperature for each fluid circuit. A central digital computer is connected to receive signals from each of the temperature sensors and thermostats and to calculate and record the known rate of flow and the integral of the difference between the inlet and outlet temperatures of each circuit and the rate of flow over the time that the flow control valve for that circuit is open. The system is particularly adapted for use in the conversion of unmetered heating/cooling systems to the metered type.

7 Claims, 4 Drawing Figures

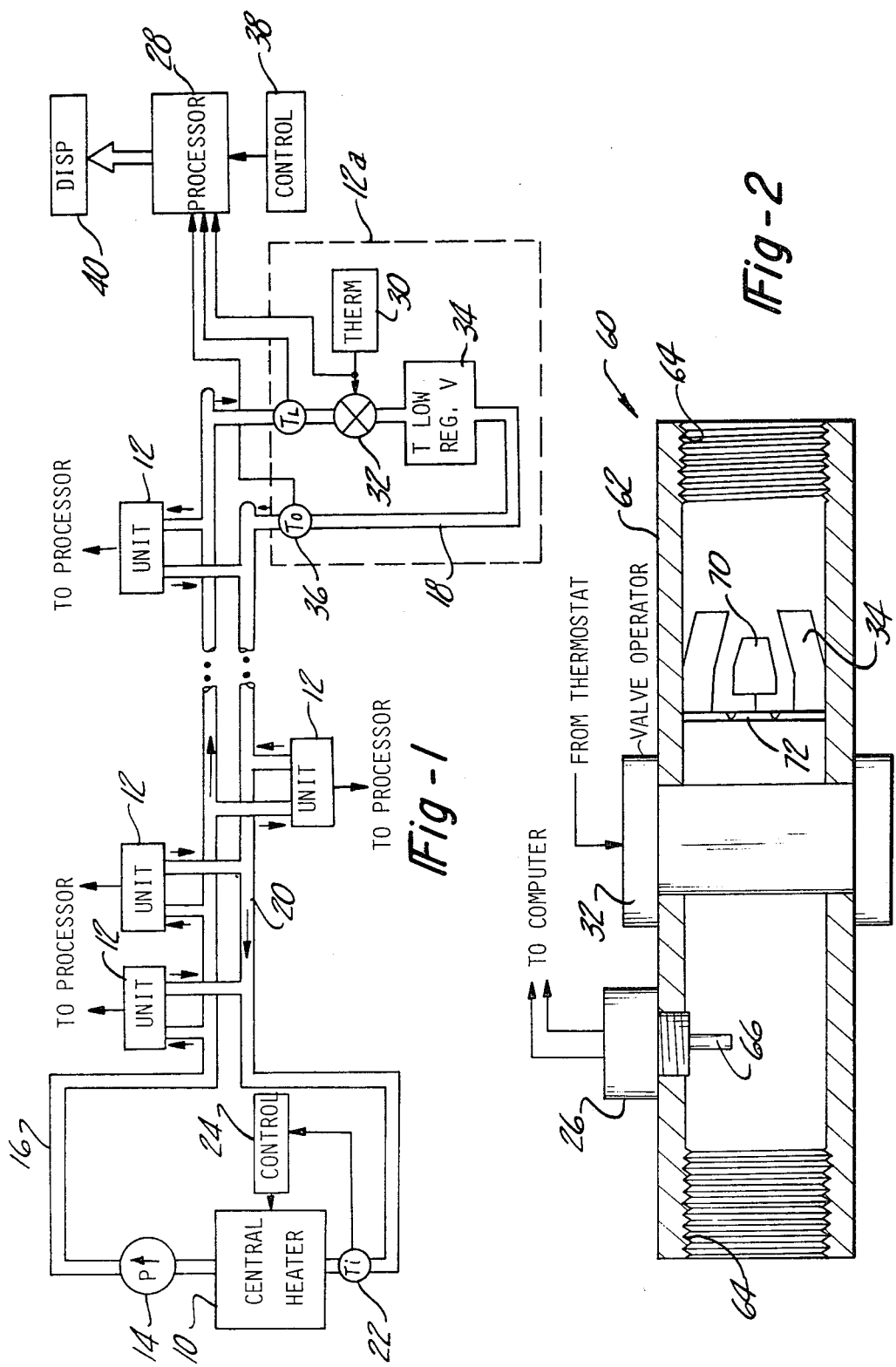

THERMAL ENERGY USAGE METER FOR MULTIPLE UNIT BUILDING

TECHNICAL FIELD

This invention relates to a system for measuring the thermal consumption of each of a plurality of fluid circuits serviced by a central temperature modifying apparatus and to a method of converting such a system of the unmetered type to metered operation.

BACKGROUND ART

A common arrangement for providing heating and/or cooling for each of the units of multi-tenant buildings such as apartment houses or office structures employs a liquid heat transfer media, usually water, which is heated and/or cooled by a central furnace/cooler connected in a main flow circuit. Individual flow circuits for the individual units are connected to the main in parallel through individual thermostatically controlled shut-off valves. Thermostatic sensors for these valves are located in the individual units to automatically and independently control the flow of the heat transfer media through the circuits which condition their associated units.

It is often desirable to measure the thermal energy consumption of each unit for billing purposes and a variety of systems have been proposed for measuring the energy consumption of each of a number of flow circuits leading off the common main. These systems generally employ temperature sensors connected to the input and output of each circuit, to measure the temperature change over the circuit, a flow meter for each circuit to measure the rate of flow volume through the circuit and an integrator to generate a signal proportional to the integral of the varying temperature differential and flow for each circuit over a period of time. For example, U.S. Pat. Nos. 759,306; 1,903,717; 2,359,767; 3,014,370; 3,216,248; 3,301,049; 3,593,578; 3,631,717; 3,842,669; 3,979,952; 4,048,852; 4,049,044; and 4,157,034 disclose systems employing integrating flow meters for individual circuits and to computers for servicing multiple flow circuits to determine the energy consumption in each unit by the time integration of varying temperature differential and flow signals.

These systems are relatively complex and require a substantial number of sensors and extensive wiring. Their costs may represent a substantial portion of the total cost of the heating and cooling apparatus in original construction and when a computerized system is to be retrofitted to existing construction so that the individual units can be metered, as when a commonly owned apartment building is converted into individually owned condominiums, the metering cost is often prohibitive.

DISCLOSURE OF THE INVENTION

The present invention is therefore directed toward an electronic system for measuring and recording the energy consumption of each of a plurality of fluid circuits all connected to a central main including a central heating and/or cooling apparatus, which is relatively simple and economical compared to the prior art and may be easily installed in existing central heating/cooling systems to convert them to individual metering.

The system of the present invention eliminates the need for expensive flow sensors by providing automatic regulating constant flow valves in each of the circuits and providing a central computer with the same thermostat signal that controls the shut-off valves associated with each circuit. This substitutes a constant value for the time varying variable flow parameter associated with the prior art systems so that the calculation of energy usage is a simple function of temperature differential between inlet and outlet of a circuit and the time that the thermostatically operated flow shut-off valve for that circuit is open. This substantially simplifies the computation of energy usage as well as eliminating the need for expensive flow sensors in each circuit. Since the thermostatic sensors that control the shut-off valves for each circuit are already installed in unmetered central heating/cooling systems, an existing multi-unit system can be converted to the metered variety by simply installing temperature sensors at the inlet and outlet of each flow circuit, installing an automatic flow regulator valve at the inlet, and connecting the thermostat for each unit and the outputs of the two temperature sensors to a central computer.

In a preferred embodiment of the invention one of the temperature sensors, preferably the inlet sensor, and the flow regulator valve are associated in a single unit to simplify the installation of the system. A further embodiment provides a single integral unit incorporating the thermostatically controlled shut off valve, the inlet temperature sensor and the flow regulator valve for each unit.

The system of the present invention is simple, inexpensive, reliable in operation and easy to install in new construction or existing unmetered systems. Other objectives, advantages and applications of the present invention will be made apparent by the following detailed description of several preferred embodiments of the invention. The description makes reference to the accompanying drawings in which:

BRIEF DESCRIPTION OF THE DRAWINGS

FIG. 1 is a schematic diagram of a centrally powered fluidic heating system for a multiple unit building employing a preferred embodiment of the present invention to determine the energy consumption of each unit;

FIG. 2 is a sectional view through an assembly including a thermostatically controlled shut-off valve, a constant flow regulating valve, and a temperature sensor, useful in the system of FIG. 1 and forming one aspect of the present invention;

BEST MODE FOR CARRYING OUT THE INVENTION

Figure 3:
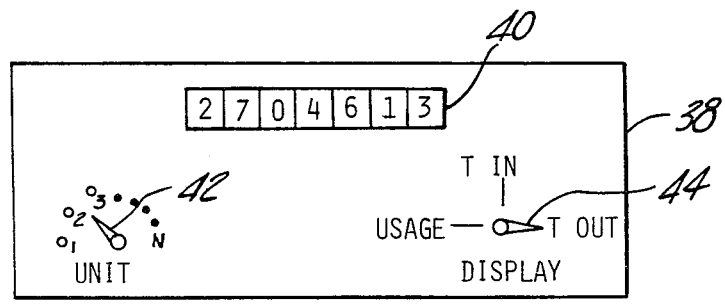
FIG. 3 is a front view of the panel of the processor control employed with the present invention.

The preferred embodiment of the present invention is employed in connection with a central heater 10 which provides thermal energy for maintaining desired temperatures within a plurality of units 12. The units are normally compartments within a multi-tenant building, such as a residential apartment house or a multi-unit office building with the central heater 10 being located in the same building. Alternatively, some or all of the units could be located in physically separate buildings as in a series of garden apartments or the like.

The central heater 10 and an associated pump 14 provide the heated fluid media, usually water, possibly with one or more additives, to an output main 16. The main 16 connects to each of the units 12, in parallel, and provides each unit with heated fluid. The fluid flows through radiating pipes arrayed in each unit, as the radiator pipe 18 illustrated in unit 12a, to provide heat for the unit. The output flow from each unit is provided to a return main 20 which connects to the central heater 10.

A temperature sensor 22 is supported in the return main 20 adjacent to the central heater and provides an electrical signal proportional to the temperature of the return water to a control unit 24 which regulates combustion in the central heater 10, on either an on/off or a proportional basis.

The unit 12a is typical of the units 12 and is illustrated in more detailed form. It includes a temperature sensor 26 provided in the input connection from the supply main 16. The sensor 26 generates an electrical signal as a function of the temperature of the input flow to the unit 12a. This electrical signal from the sensor 26, amplified if necessary, is provided to a central processor 28. The processor receives a plurality of other signals from input temperature sensors associated with each of the units 12.

The temperature within the unit 12a is regulated by a conventional thermostat 30 disposed at a central location within the unit 12a. The thermostat 30 provides a signal to a flow control valve 32 disposed in series with the input line from the flow main 16. When the thermostat 30 senses that the temperature within the unit is below a set point, which may be manually entered into the thermostat in a conventional manner, a signal is sent to the flow control valve 32 opening the valve and allowing flow to pass through the heat exchanger 18. When the thermostat senses that the temperature within the unit has risen above the set point a signal is sent to the flow control valve shutting off the flow of heating fluid. The signal from the thermostat 30 is also provided to the processor 28 along with signals from similar thermostats which service the other units 12.

Each unit 12a additionally includes a constant flow regulator valve 34 disposed within the radiator line 18 in series with the flow control valve 32. The flow regulator valve is of the type that maintains the flow through the heat exchanger 18 at a constant rate. A variety of such valves is commercially available. Thus, when the flow control valve 32 is opened, fluid flows through the heat exchanger line 18 at a known rate.

An output temperature sensor 36 is disposed in the unit 12a adjacent to the connection between the heat exchanger line 18 and the return main 20. The sensor 36 generates an electrical signal proportional to the temperature at the output of the heat exchanger and provides that signal to the processor 28. The other units 12 supply the processor with similar electrical signals proportional to the output temperature from those units.

The processor 28, accordingly, receives three electrical signals from each unit 12; a signal from the thermostat 30 which indicates whether fluid is flowing through the heat exchanger line 18 within the unit; a signal from the input temperature sensor 26 representative of the temperature of the fluid flowing into the supply main 16; and a signal from the output temperature sensor 36 representative of the fluid temperature when it is returned to the main 20 from the heat exchanger line 18. The processor 28 operates upon these signals to calculate and record a value representative of the thermal energy usage of each unit. This usage is calculated as a function of the difference between the inlet and outlet temperatures from each unit, integrated over the period of time that fluid flow is occurring through the unit and the rate of flow as established by the flow restrictor.

The processor 28 preferably constitutes a suitably programmed general purpose computer operating under signals from a control unit 38. A display 40 is associated with the processor and provides an output of information received and calculated by the processor. The display 40 might also include a printer for generating a permanent record of the energy usage of each of the units or a device for transmitting this data to a remote terminal.

The panel of the control 38 is illustrated in FIG. 3 and includes a button 42 which the operator may employ to select a particular unit. It also includes a button 44 which controls the display to cause it to indicate the input temperature for a unit selected by the user entry of unit 42; the output temperature, the percent of total usage or the cumulative usage of that unit. The indicated information is provided on the display 40.

Figure 4:
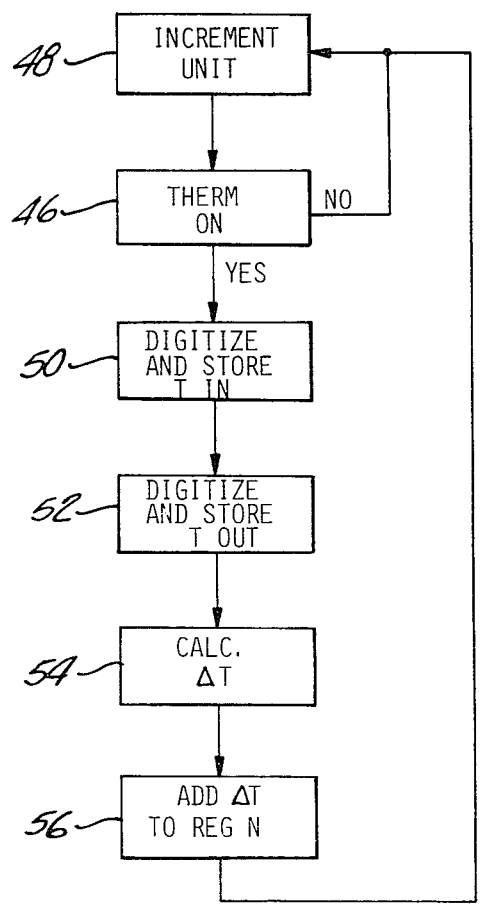
FIG. 4 is a flow chart of the repetitive routine used to measure the thermal energy consumption of each unit.

FIG. 4 represents the broad flow chart of the preferred routine used by the processor 28 to calculate the energy usage of each of the units based upon the electrical signals received from the units. The routine involves rapidly scanning the signals from the thermostats 30 to determine if fluid is flowing through each particular unit's heat exchanger pipe. The block 46 represents the step of determining whether the thermostat for a particular unit, selected by a previous operation 48, is commanding a flow through that unit's heat exchanger pipe. If the thermostat signal is such as to indicate no flow, the program returns to block 48 and increments the scan so that the next successive unit is examined. When a unit is reached which has a thermostat commanding flow, the program proceeds to block 50 where the signal from the input temperature sensor 26 for that unit is first digitized and then stored. In certain embodiments of the system the sensors will provide a direct digital signal and it will not be necessary to digitize them. The controller could also operate on a completely analog basis, but the preferred embodiment employs analog sensors and the processor digitizes their signals.

Next the system advances to block 52 in which the signals from the temperature output sensors 36 for the unit being considered are similarly digitized and stored. Then the system moves to block 54 in which the output temperature as calculated in block 52 is subtracted from the input temperature as calculated in block 50 to generate a temperature differential. That value is then added to a register associated with the particular unit being scanned, by an operation indicated at 56. The program proceeds at a rapid and regular rate so that while the thermostat for a particular unit is calling for a flow through the unit the time varying temperature differential signal, which is proportional to the thermal energy instantly being used by the unit, is added into a register at a constant rate. The register effectively integrates the temperature differential signal over the period of time that flow is occurring through the unit.

After the operation called for in block 56 is completed the system returns to block 48. The program is such that each unit is scanned at a constant rate, independent of the number of units in which fluid flow is occurring. The register associated with each unit thus maintains a store which is proportional to the energy usage of the unit and the program may contain routines for normalizing that stored value into units of actual energy usage.

In order to simplify the installation of the present system, particularly in situations in which it is being retro-fitted into an existing heating/cooling system which does not have energy usage metering, the present invention provides a single assembly, generally indicated at 60 in FIG. 3, which incorporates all of the elements which must be added to a conventional fluid heating system to generate the signals required by the present invention, with the exception of the output flow sensor 36. The unit 60 is incorporated in a section of pipe 62 with threaded couplings 64 formed at either end so that it may be joined into the fluid circuit. The unit 60 includes an analog input temperature sensor 26 having a probe 66 which extends into the interior of the pipe 60; or which alternatively may be clamped to the pipe surface with an insulated clamping device, a conventional solenoid or motor operated shut-off valve 32 and a flow regulator device 34. The flow regulator valve may be any commercially available variety but preferably employs a variable orifice channel adjusted by a floating throttle member 70 that is controlled by a diaphragm 72 sensitive to the fluid flow.

The assembly 60 may be incorporated in each fluid circuit 12 adjacent to the supply main 16. It is then only necessary to insert an output temperature sensor 36 in each unit in order to allow the use of the system of the present invention.

I claim:

1. A system for measuring the thermal energy dissipated in each of a plurality of units, each having a separate fluid circulating circuit served from a common pressurized main, comprising: thermostatically controlled electric shut-off valves disposed in each fluid circuit; an automatic constant flow regulating orifice in each fluid circuit; means for generating electrical signals representative of the inlet and outlet temperatures of the fluid medium in each circuit; and a digital computer connected to each of the shut-off valves and operative to receive the electric signals representative of the inlet and outlet fluid temperatures from each circuit, the computer being programmed to successively scan the outputs of the thermostatically controlled shut-off valves and temperature sensors associated with each unit and operative to generate a plurality of signals, one for each circuit, each representative of the integral of the difference between the inlet and outlet temperatures for that circuit over the time period that the flow control valve for that circuit is open.

2. The system of claim 1 wherein said automatic flow control orifices are of the pressure compensating variable orifice type.

3. The system of claim 1 wherein the thermostatic shut-off valve, automatic flow regulating valve, and of the temperature sensors in each unit are integrated in a single assembly.

4. The system of claim 1 wherein each unit comprises a separate unit in a multi-tenant building.

5. The system of claim 1 in which each of the units comprises one tenant occupied area of a multiple tenant building and each thermostatically controlled valve includes a temperature sensor disposed within its associated area and operative to sense the temperature within that area.

6. The system of claim 1 including an electronic memory for recording the signals representative of the integral for each circuit.

7. The system of claim 6 including display means connected to the computer and means for controlling the computer to cause the display of the recorded integral associated with any one of the units.

* * * * *